United States Patent
Basil et al.

(10) Patent No.: US 6,180,248 B1
(45) Date of Patent: *Jan. 30, 2001

(54) SILOXANE ORGANIC HYBRID POLYMERS

(75) Inventors: John D. Basil, Pittsburgh; Chia-Cheng Lin, Allison Park; Robert M. Hunia, Kittanning; Helmut Franz, Pittsburgh, all of PA (US)

(73) Assignee: PPG Industries Ohio, Inc., Cleveland, OH (US)

( * ) Notice: Under 35 U.S.C. 154(b), the term of this patent shall be extended for 0 days.

This patent is subject to a terminal disclaimer.

(21) Appl. No.: 07/799,805

(22) Filed: Nov. 29, 1991

Related U.S. Application Data

(63) Continuation-in-part of application No. 07/546,069, filed on Jun. 29, 1990, now Pat. No. 5,916,686, and a continuation-in-part of application No. 07/546,484, filed on Jun. 29, 1990, now Pat. No. 5,344,712, and a continuation-in-part of application No. 07/500,642, filed on Mar. 28, 1990, now Pat. No. 5,401,579, which is a continuation-in-part of application No. 07/133,831, filed on Dec. 16, 1987, now abandoned.

(51) Int. Cl.[7] .................................................. B32B 9/04
(52) U.S. Cl. .......................... 428/447; 427/387; 528/26; 528/32; 106/287.13
(58) Field of Search ................... 428/447; 427/387; 528/32, 26; 106/287.13

(56) References Cited

U.S. PATENT DOCUMENTS

| | | | |
|---|---|---|---|
| 3,004,863 | 10/1961 | Gray, Jr. et al. | 65/30.1 |
| 3,582,395 | 6/1971 | Adams et al. | 428/428 |
| 3,941,719 | 3/1976 | Yoldas | 502/355 |
| 3,944,658 | 3/1976 | Yoldas | 423/626 |
| 3,986,997 | * 10/1976 | Clark | 524/300 |
| 4,027,073 | * 5/1977 | Clark | 428/412 |
| 4,208,475 | 6/1980 | Paruso et al. | 429/320 |
| 4,214,057 | * 7/1980 | Ishihara et al. | 525/100 |
| 4,242,403 | 12/1980 | Mattimoe et al. | 428/213 |
| 4,244,986 | 1/1981 | Paruso et al. | 427/126.4 |
| 4,271,210 | 6/1981 | Yoldas | 427/169 |
| 4,275,118 | * 6/1981 | Baney et al. | 428/412 |
| 4,278,632 | * 7/1981 | Yoldas | 264/621 |
| 4,286,024 | 8/1981 | Yoldas | 428/446 |
| 4,293,594 | 10/1981 | Yoldas et al. | 427/107 |
| 4,336,309 | * 6/1982 | Jackel et al. | 428/447 |
| 4,346,131 | 8/1982 | Yoldas | 428/34.7 |
| 4,357,427 | 11/1982 | Ho et al. | 501/153 |
| 4,390,373 | 6/1983 | White et al. | 106/287.12 |
| 4,405,679 | * 9/1983 | Fujioka et al. | 428/216 |
| 4,442,168 | 4/1984 | White et al. | 428/331 |
| 4,477,499 | 10/1984 | Doin et al. | 427/412.1 |
| 4,500,669 | * 2/1985 | Ashlock et al. | 524/440 |
| 4,568,578 | 2/1986 | Arfsten et al. | 428/34 |
| 4,571,365 | 2/1986 | Ashlock et al. | 428/412 |
| 4,799,963 | 1/1989 | Basil et al. | 106/287.13 |
| 5,316,854 | 5/1994 | Lin | 428/426 |
| 5,344,712 | 9/1994 | Basil | 428/412 |

FOREIGN PATENT DOCUMENTS

| | | |
|---|---|---|
| 84303605 | 2/1986 | (EP) . |
| 85110293 | 2/1986 | (EP) . |
| 1494209 | 12/1977 | (GB) . |
| 49-003932 | 1/1974 | (JP) . |

OTHER PUBLICATIONS

*Physics of Thin Films,* vol. 5, p. 134–139, G. Haas and R. E. Thun, Academic Press, 1969.
*Journal of Applied Polymer Science,* vol. 26, p. 2381–2389, A. J. Klein et al., 1981.
*Polymer Bulletin,* No. 14, p. 557–564, (1985), Huang et al.
*Journal of Non–Crystalline Solids,* vol. 63, p. 283–292, (1984), Philipp et al.
G. Philipp. and M. Schmidt Journal of Non–Crystalline Solids 63 (1984) 283–292.*
A.J. Klein et al. Journal of Applied Polymer Science vol. 26, 2381–2389 (1981).*
H. Schroeder, Physics of Thin Films, vol. 5., Ch. 3, 1969.*

\* cited by examiner

*Primary Examiner*—Leszek Kiliman
(74) *Attorney, Agent, or Firm*—Donald C. Lepiane; Kenneth J. Stachel

(57) ABSTRACT

Siloxane organic hybrid polymers and a method of making them by condensation polymerization reaction of organoalkoxysilane in the presence of organic film-forming polymers are disclosed. Alkali metal carboxylic acid catalyst is also disclosed, as well as the incorporation of cerium oxide for attenuation of ultraviolet radiation.

6 Claims, No Drawings

SILOXANE ORGANIC HYBRID POLYMERS

CROSS REFERENCE TO RELATED APPLICATIONS

This application is a continuation-in-part of U.S. application Ser. No. 07/546,069 U.S. Pat. No. 5,916,686 and 07/546,484 now U.S. Pat. No. 5,344,712 both filed Jun. 29, 1990, and Ser. No. 07/500,642 now U.S. Pat. No. 5,401,579 filed Mar. 28, 1990, which is in turn a continuation-in-part of U.S. application Ser. No. 07/133,831 now abandoned filed Dec. 16, 1987, by the same inventors.

FIELD OF THE INVENTION

The present invention relates generally to the art of hydrolytic condensation polymers of organoalkoxysilanes, and also to the art of organic hybrid polymers of alkoxysilanes, and particularly to the art of coatings which attenuate ultraviolet radiation.

BACKGROUND OF THE INVENTION

U.S. Pat. No. 4,405,679 to Fujioka et al. discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. Nos. 4,500,669 and 4,571,365 to Ashlock et al. disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

In the *Journal of Non-Crystalline Solids*, Vol. 63 (1984), Philipp et al. disclose in "New Material for Contact Lenses Prepared From Si- and Ti-Alkoxides by the Sol-Gel Process" that it is possible to combine inorganic and organic elements to develop materials with special properties.

SUMMARY OF THE INVENTION

To combine the mechanical strength and stability of inorganic materials with the flexibility and film-forming ability of organic materials is an objective of this invention. Organic-inorganic hybrid polymers in accordance with the present invention are prepared by hydrolytic condensation polymerization of an organoalkoxysilane in the presence of a water soluble organic polymer such as polyvinylpyrrolidone, preferably with an alkali metal carboxylic acid used as the condensation catalyst. Cerium oxide is preferably incorporated into the polymer for attenuation of ultraviolet radiation.

DESCRIPTION OF THE PREFERRED EMBODIMENTS

Commercial abrasion-resistant coatings for stretched acrylic either contain colloidal silica and exhibit poor resistance to corrosion by solvents such as acetone and sulfuric acid, or are based on relatively soft organic polymer systems such as urethanes or melamines.

The hydrolysis of silanes of the general formula $R_xSi(OR')_{4-x}$, wherein R is an organic radical, R' is a hydrolyzable low molecular weight alkyl group and x is at least one and less than 4, such as methyltrimethoxysilane, dimethyldiethoxysilane and γ-methacryloxypropyltri-ethoxysilane can be carried out under controlled conditions in the presence of appropriate additives and produces stable, clear solutions that exhibit excellent adhesion to unprimed stretched or cast acrylic. Cured coatings, preferably about four microns thick, typically exhibit Bayer abrasion results (i.e., percent haze after 300 cycles of one kilogram load) of 5–10 percent, have a stress crazing time of 17 minutes upon exposure to acetone and 30 minutes upon exposure to 75% sulfuric acid under 3000 pounds per square inch pressure, and remain crack-free for up to 1900 hours of ultraviolet radiation exposure.

Preferably, the silane hydrolytic polycondensation is catalyzed by an appropriate acid which is volatile and which does not lower the pH of the solution excessively. Preferred catalysts include acetic acid and trifluoroacetic acid and sodium acetate. A preferred pH is about 5. The temperature of the hydrolytic polycondensation reaction must be controlled either by external cooling, or by adjusting the solvent and acid composition to control the reaction rate, preferably not to exceed 45° C. A catalyst, preferably sodium acetate, is added to promote complete cure of the siloxane polymer at temperatures preferably in the range of 80° C. A high molecular weight water soluble organic polymer, preferably polyvinylpyrrolidone having a molecular weight of at least 300,000, is added to optimize film formation. Colloidal ceria is added for attenuation of ultraviolet radiation. In order to incorporate ceria without forming haze, it is necessary to control the pH of the sol at a relatively high level. This is accomplished by omitting additional acid catalyst for silane hydrolysis and increasing the quantity of sodium acetate. Acrylic or primed polycarbonate samples are preferably coated by dip coating, dried in air at ambient temperature for about 30 minutes and cured at 80° C. for about 2 hours. The coated sample is subjected to standard Bayer abrasion testing for 300 cycles, and QUV-B exposure alternating 8 hours of ultraviolet irradiation at 60° C. and 4 hours at 45° C. and 100 percent relative humidity without ultraviolet irradiation. The above invention will be further understood from the description in the specific examples which follow.

EXAMPLE I

A solution is prepared comprising 3.0 grams of polyvinylpyrrolidone dissolved in a solvent comprising 50 grams of water, 50 grams of methanol and 2 grams of formaldehyde (37% solution). The polyvinylpyrrolidone has a molecular weight of about 630,000 and is commercially available as K-90 from GAF Corp. A mixture of silanes comprising 80 grams of methyltriethoxysilane and 8 grams of dimethyldiethoxysilane is added to the polyvinylpyrrolidone solution at room temperature, along with three drops of trifluoroacetic acid. After stirring the reaction mixture for two hours, 50 grams of isobutanol and 0.1 gram of sodium acetate trihydrate are added. After further stirring, the sol is filtered and applied to either stretched acrylic or cast acrylic by dip coating for five minutes at room temperature. No pretreatment of the acrylic surface is necessary. The coating is cured at 80° C. for 16 hours. After 300 cycles of Bayer Abrasion testing, the coated acrylic exhibits only 13.7 percent haze, compared with 50 percent haze for uncoated acrylic after the same abrasion testing.

EXAMPLE II

A solution is prepared comprising 18 grams of polyvinylpyrrolidone dissolved in a solvent comprising 330 grams of deionized water and 330 grams of methanol. A second solution is prepared comprising 480 grams of methyltrimethoxysilane, 48 grams of dimethyldiethoxysilane and 24 grams of glacial acetic acid. The two solutions are combined, stirred for 2 hours at ambient temperature, and diluted with 300 grams of 2-propanol and 150 grams of diacetone alcohol containing 1.8 grams of sodium acetate. A stretched acrylic substrate is dipped into this coating composition and dried in air at ambient temperature for 5 to 10 minutes before curing the coating at 80° C. for 2 hours. After 300 cycles of Bayer Abrasion testing, the coated acrylic exhibits only 8 to 10 percent haze compared with 50 percent haze for uncoated acrylic after the same abrasion testing.

EXAMPLE III

Three grams of the polyvinylpyrrolidone of Example I are dissolved in a solution comprising 35 grams of deionized water and 35 grams of methanol. The solution is stirred for 15 minutes before adding 80 grams of methyltrimethoxysilane, 8 grams of dimethyldiethoxysilane and 4 grams of glacial acetic acid. The mixture is stirred for 2 hours at room temperature, after which 0.2 grams of sodium acetate is added and the mixture is diluted with 50 grams of 2-propanol. A stretched acrylic substrate is dip-coated into the above composition, and the coating is cured at 80° C. for 4 hours. The cured coating is then subjected to Bayer Abrasion testing with the result of 3.5 percent haze after 300 cycles. Ultraviolet radiation exposure testing (QUV-B) results in only light cracking of the coating after 1732 hours.

EXAMPLE IV

Three grams of the polyvinylpyrrolidone of the previous examples is dissolved in 55 grams of deionized water and 55 grams of methanol. After stirring the solution for 15 minutes, 80 grams of methyltrimethoxysilane, 8 grams of dimethyldiethoxysilane and 4 grams of glacial acetic acid are added to the polyvinylpyrrolidone solution. After stirring the sol for 2 hours, 0.2 grams of sodium acetate is added, and the sol is diluted with 50 grams of 2-propanol. A stretched acrylic substrate is dip-coated into the sol, and the coating is cured at 80° C. for 4 hours. The cured coating is subjected to Bayer Abrasion testing with a result of 3.2 percent haze after 300 cycles. In QUV-B testing at 60° C. the coating shows some debonding only after 1184 hours.

EXAMPLE V

Three grams of the polyvinylpyrrolidone of the previous examples are dissolved in 75 grams of deionized water and 75 grams of methanol. After stirring the solution for five minutes, 80 grams of methyltrimethoxysilane, 8 grams of dimethyldiethoxysilane and 4 grams of glacial acetic acid are added. After stirring for 2 hours at room temperature, 0.2 grams of sodium acetate and 50 grams of isopropanol are added. A stretched acrylic substrate is dip-coated into the above composition, and the coating is cured at 80° C. for 4 hours. The cured coating is subjected to Bayer Abrasion testing and shows 3.9 percent haze after 300 cycles.

EXAMPLE VI

Three grams of the polyvinylpyrrolidone of the previous examples are dissolved in 55 grams of deionized water and 55 grams of methanol. After stirring the solution for 15 minutes, 60 grams of methyltrimethoxysilane, 6 grams of dimethyldiethoxysilane and 4 grams of glacial acetic acid are added. After stirring for 2 hours at room temperature, 0.2 grams of sodium acetate and 50 grams of 2-propanol are added. A stretched acrylic substrate is dip-coated into the above composition, and the coating is cured at 80° C. for 4 hours. The cured coating is subjected to Bayer Abrasion testing with a result of 8.4 percent haze. The coating is also subjected to QUV-B exposure, and shows a few cracks after 1328 hours.

EXAMPLE VII

Three grams of the polyvinylpyrrolidone of the previous examples are dissolved in 55 grams of deionized water and 55 grams of methanol. After stirring the solution for 15 minutes, 78.5 grams of methyltriethoxysilane, 7.8 grams of dimethyldiethoxysilane and 4 grams of glacial acetic acid are added. After stirring at room temperature overnight, 0.2 grams of sodium acetate and 50 grams of 2-propanol are added. A stretched acrylic substrate is dip-coated into the above composition, and the coating is cured at 80° C. for 4 hours. The coating shows some cracks after 642 hours of QUV-B exposure.

EXAMPLE VIII

Eighteen grams of the polyvinylpyrrolidone of the previous examples are dissolved in 330 grams of deionized water and 330 grams of methanol. After stirring the solution for 15 minutes, 480 grams of methyltrimethoxysilane, 48 grams of dimethyldiethoxysilane and 24 grams of glacial acetic acid are added. After stirring at room temperature for 2 hours, 0.2 grams of sodium acetate, 300 grams of 2-propanol and 125 grams of diacetone alcohol are added. A stretched acrylic substrate is dip-coated into the above composition, and the coating is cured at 80° C. for 2 hours. The cured coating subjected to Bayer Abrasion testing shows 5.5 percent haze after 300 cycles, and has a few craze lines after 1406 hours of QUV-B exposure.

EXAMPLE IX

A solution is prepared comprising 3.0 grams of polyvinylpyrrolidone dissolved in a solution comprising 45 grams of water and 15 grams of aqueous colloidal ceria sol. The ceria sol is 20 percent solids, has a pH of 3.2 and is commercially available from Rhone-Poulenc. The polyvinylpyrrolidone has a molecular weight of about 630,000 and is commercially available as K-90 from CAF Corp. A mixture of silanes comprising 105 grams of methyltriethoxysilane and 10.4 grams of dimethyldiethoxysilane is added to the aqueous polyvinylpyrrolidone/ceria mixture at room temperature. No acid catalyst is used. After vigorously stirring the reaction mixture for about one hour, the immiscible aqueous sol and organosilanes mix with the evolution of heat to form a clear orange sol. After another hour of mixing, 50 grams of isopropanol, 25 grams of diacetone alcohol and 0.8 grams of sodium acetate trihydrate are added. The pH of the reaction mixture increases to about 5.0. After further stirring for about 30 minutes, the sol is filtered and applied to either acrylic substrates or polycarbonate substrates treated with an acrylic primer by dip coating for five minutes at room temperature. The coating is air-dried for at least 5 minutes, then cured at 80° C. for 0.5 to 2 hours. The luminous transmittance is 91.5 percent and the haze is 0.5 percent. After 300 cycles of Bayer abrasion testing, the coated samples exhibit only 8 to 12 percent haze, compared with 50 percent haze for uncoated acrylic after the same abrasion testing. After 300 cycles of Taber abrasion testing, the coated samples exhibit 10 to 14 percent haze. The coating withstands 400 to 600 hours of QUV-B313 without cracking, crazing or debonding and with a change in yellowness index (YID) of less than 1, and more than 1200 hours of QUV-540.

EXAMPLE X

A solution is prepared comprising 3.0 grams of polyvinylpyrrolidone dissolved in a solvent comprising 50 grams of water, 50 grams of methanol and 2 grams of formaldehyde (37% solution). The polyvinylpyrrolidone has a molecular weight of about 630,000 and is commercially available as K-90 from GAF Corp. A mixture of siloxanes comprising 80 grams of methyltrimethoxysilane and 8 grams of dimethyldiethoxysilane is added to the polyvinylpyrrolidone solution at room temperature. After stirring the reaction mixture for two hours, 50 grams of isobutanol and 0.1 gram of sodium acetate trihydrate are added. After further stirring, the sol is filtered and applied to either stretched acrylic or cast acrylic by dip coating for five minutes at room temperature. No pretreatment of the acrylic surface is necessary. The coating is dried in air at ambient temperature for 30 minutes and cured at 80° C. for 2 hours. After 300 cycles of Bayer abrasion testing, the coated acrylic exhibits good adhesion and only 16.2 percent haze, compared with 50 percent haze for uncoated acrylic after the same abrasion testing.

The above examples are offered to illustrate the present invention. The composition and concentration of the silane, constitution of the alcohol diluent, concentration and type of the acid and/or alkali metal carboxylic acid catalyst, ceria sol concentration and proportion, water content, organic polymer and proportion, and other reaction conditions may be varied in accordance with the present invention. The abrasion resistant siloxane organic hybrid polymer coating of the present invention may be used on other substrates. The scope of the present invention is defined by the following claims.

What is claimed is:

1. An abrasion resistant coated plastic transparency comprising a rigid transparent plastic substrate, and a siloxane organic hybrid polymer coating wherein said coating comprises reaction product of:
   a. an organoalkoxysilane or mixture of organoalkoxysilanes of the general formula $R_xSi(OR')_{4-x}$ wherein R is an organic radical, R' is a low molecular weight alkyl group forming a hydrolyzable alkoxy, and x is at least one and less than 4;
   b. an alkali metal carboxylic acid catalyst; and
   c. an organic film-forming polymer.

2. An article according to claim 1, wherein said catalyst is sodium acetate and said polymer is polyvinylpyrrolidone.

3. An abrasion resistant and ultraviolet radiation resistant coated plastic transparency comprising:
   a. a rigid transparent plastic substrate; and
   b. a siloxane coating containing cerium oxide and sodium acetate.

4. An article according to claim 3, wherein said coating comprises reaction product of:
   a. an organoalkoxysilane or mixture of organoalkoxysilanes of the general formula $R_xSi(OR')_{4-x}$ wherein R is an organic radical, R' is a hydrolyzable low molecular weight alkyl group, and x is at least one and less than 4;
   b. an organic film-forming polymer; and
   c. colloidal cerium oxide.

5. An article according to claim 4, wherein the rigid transparent plastic substrate is selected from the group consisting of polyacrylate substrates and polycarbonate substrates.

6. The article according to claim 3, wherein the rigid transparent plastic substrate is selected from the group consisting of polyacrylic substrates and polycarbonate substrates.

* * * * *